United States Patent [19]

Kemp, Jr.

[11] Patent Number: 4,765,952
[45] Date of Patent: Aug. 23, 1988

[54] PROCESS FOR PRODUCING TUNGSTEN HEAVY ALLOY SHEET BY A LOOSE FILL HYDROMETALLURGICAL PROCESS

[75] Inventor: Preston B. Kemp, Jr., Athens, Pa.

[73] Assignee: GTE Products Corporation, Stamford, Conn.

[21] Appl. No.: 143,865

[22] Filed: Jan. 14, 1988

[51] Int. Cl.$^4$ .............................................. B22F 9/22
[52] U.S. Cl. ............................... 419/47; 75/0.5 AB; 419/34; 419/46
[58] Field of Search ............... 75/0.5 AB; 419/34, 46, 419/47

[56] References Cited

U.S. PATENT DOCUMENTS

| | | | |
|---|---|---|---|
| 2,467,675 | 4/1949 | Kurtz et al. | 419/34 |
| 2,776,887 | 1/1957 | Kelly, Jr. et al. | 419/34 |
| 3,176,386 | 4/1965 | Grant et al. | 419/34 |
| 3,310,400 | 3/1967 | Alexander et al. | 419/47 |
| 3,318,696 | 5/1967 | Krock et al. | 419/34 |
| 3,997,331 | 12/1976 | Tithey | 75/0.5 AB |

*Primary Examiner*—Wayland Stallard
*Attorney, Agent, or Firm*—Donald R. Castle; L. Rita Quatrini

[57] ABSTRACT

A process is disclosed for producing tungsten heavy alloy sheet. The process comprises crystallizing from solution the compounds of the component metals of the alloy, and drying the compounds, introducing the compounds into a container so that the compounds are loosely and uniformly packed in the container, the container being made of molybdenum coated with a ceramic, and having the same shape as the sheet which is to be made. The compounds are then reduced to their respective metals and the resulting metal powder is sintered to a density equal to or greater than about 90% of the theoretical density of the alloy to form the sheet.

3 Claims, No Drawings

PROCESS FOR PRODUCING TUNGSTEN HEAVY ALLOY SHEET BY A LOOSE FILL HYDROMETALLURGICAL PROCESS

CROSS REFERENCE TO RELATED APPLICATIONS

This invention is related to the followig applications: attorney's docket D-87-2-052 entitled "Process For Producing Tungsten Heavy Alloy Sheet", D-87-2-053 entitled "Process For Producing Tungsten Heavy Alloy Sheet Using A Metallic Salt Binder," D-87-2-054 entitled "Process For Producing Tungsten Heavy Alloy Sheet Using Hydrometallurgically Produced Tungsten Heavy Alloy", D-87-2-176 entitled "Process For Producing Tungsten Heavy Alloy Sheet By Direct Hydrometallurgical Process", and D-87-2-055 entitled "Process For Producing Tungsten Heavy Alloy Sheet Using High Temperature Processing Techniques", all of which are filed concurrently herewith and all of which are assigned to the same assignee as the present application.

This invention relates to a process for producing tungsten heavy alloy sheet by uniformly and loosely filling a container with the compounds of the components of the alloy which have been crystallized from solution, and thereafter reducing the compounds to metal powder and sintering the powder. Crystallizing the compounds from solution ensures that the component metals of the alloy are homogeneously dispersed throughout the resulting sheet.

BACKGROUND OF THE INVENTION

Tungsten heavy alloy sheet can be produced by rolling sintered slabs of the alloy. Because the rolling requires numerous anneals it is desirable that the starting slab be no more than about twice the final thickness. One method to produce these slabs is by isostatically pressing the powder alloy blends and sintering them to full density. With thin slabs it is difficult to get a uniform fill of the mold so the resulting slabs are not uniform in thickness. There is also a problem with breakage with the thin slabs. Using this method it is not possible to produce slabs with a surface area to thickness ratio much over 600 or thickness less than about 0.5".

Another method of making tungsten heavy alloy sheet is to press large billets and cut the green billet into thin slabs. While this process produces slabs of uniform thickness it has the size limitations of the previous method and there is the added expense of cutting.

Several other methods of producing tungsten heavy alloy sheet involve preparing a thick slurry of the powder blend with binders and other agents and then preparing the sheet from the slurry by extruding, tape casting or pouring and leveling on a table. Once the solvent is removed, the sheet can be handled and cut. These methods can produce thin sheets but thicker sheets are difficult or impossible to form. A big disadvantage of these processes is that binder addition and binder removal steps must be inserted into the process. Also it is difficult to obtain optimum mechanical properties in tungsten heavy alloys that have been prepared with organic binders used somewhere in the process.

SUMMARY OF THE INVENTION

In accordance with one aspect of this invention, there is provided a process for producing tungsten heavy alloy sheet. The process comprises crystallizing from solution the compounds of the component metals of the alloy, and drying the compounds, introducing the compounds into a container so that the compounds are loosely and uniformly packed in the container, the container being made of molybdenum coated with a ceramic, and having the same shape as the sheet which is to be made. The compounds are then reduced to their respective metals and the resulting metal powder is sintered to a density equal to or greater than about 90% of the theoretical density of the alloy to form the sheet a process for producing tungsten heavy alloy sheet. The process comprises crystallizing from solution the compounds of the component metals of the alloy, separating the compounds from the resulting mother liquor, drying and deagglomerating the compounds, introducing the compounds into a container so that the compounds are loosely and uniformly packed in the container, the container being made of zirconia coated molybdenum and having the same shape as the sheet which is to be made.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention relates to producing tungsten heavy alloy sheet by uniformly packing an intimate mixture of the compounds of the component metals of the alloy into a container and thereafter reducing the compounds and sintering. The intimate mixture of compounds is formed by crystallizing the compounds from solution.

Some tungsten heavy alloys which are especially suited to this invention, although the invention is not limited to these, are tungsten-iron-nickel alloys especially those in which the Ni:Fe weight ratio is from about 1:1 to about 9:1 and most preferably about 8:2. As an example of these preferred alloys are those having the following composition in percent by weight: about 8% Ni, about 2% Fe, and the balance W, about 4% Ni, about 1% Fe, and the balance W, and about 5.6% Ni, about 1.4% Fe, and the balance W. The alloys can be with or without additions of Co and/or Cu.

A solution is first formed of chemical compounds containing metal values of the alloy in the correct proportion as in the alloy. This can be done by any technique, such as by dissolving the compounds as is, in solution.

In accordance with one embodiment, the elemental metal powder components of the alloy are first dissolved in an acid solution. Calculation of the required relative amounts of the elemental powders is determined by the composition of the alloy to be produced. Dissolution of metal values in acid solution and calculation of the amounts of metal required for the alloy composition can be done by anyone skilled in the art. The acid can be a mineral acid such as hydrochloric, sulfuric, and nitric acids or an organic acid such as acetic, formic, and the like. Hydrochloric acid is especially preferred because of cost and availability. As a result of the acid dissolution of the metal powders, compounds of the respective metals are formed as precipitates. Those skilled in the art would know how to dissolve metal values in acid solution in the correct proportions.

In accordance with another embodiment, nickel powder and iron powder are dissolved in hydrochloric acid. A concentrated solution of ammonium metatungstate is added to the hydrochloric acid solution of nickel and iron. The amounts of iron, nickel, and tungsten have been calculated to be the proper amounts to result in the desired alloy composition. The pH of the resulting solution is raised to the basic side, usually to a pH of about 6.5 to about 7.5 with ammonia or ammonium hydroxide to precipitate the tungsten as ammonium paratungstate (APT) and the iron and nickel as their hydroxides.

The resulting compounds are then removed from solution. This is done by any standard technique such as filtration of the precipitate of the compounds which has formed. In this case, the compounds are then dried. Alternatively, if the compounds are highly soluble as is the case when ammonium metatungstate is one of the compounds, the solution can be spray dried to obtain the compounds or compounds.

If the compounds are insoluble in water, they can be water washed to remove contaminants before they are dried.

The compound mixture is then deagglomerated or granulated by being milled or rubbed through screens to form a fine uniform size powder.

The resulting dried compounds are then loaded into container so that the compounds are loosely and uniformly packed in the container. The container is typically made of zirconia coated molybdenum and is in the shape of the sheet which is to be made. The compounds are leveled preferably by mechanical methods such as by mechanical scraping the surface (like a doctor blade) with or without mechanical or ultrasonic vibration. Once a uniform thickness bed of compounds is formed, the container or boat is loaded into a furnace for reduction to pure metal powder and sintering.

The reduction is carried out slowly, in hydrogen by standard reduction techniques. Slow reduction is necessary in order to control rate of outgassing of gases formed during the reduction process. If the outgassing is rapid, cracks form due to shrinking. The reduction can be done in one step or in more than one step. As an example of the latter, the material in the container is first heated to decompose the compounds into their oxides. Temperature depends on the nature of the material. Time depends on the nature of the materials, temperature, amount of material being processed, the nature of the equipment, etc. Anyone skilled in the art would know how to reduce the compounds to the metals. In the case of ammonium paratungstate, nickel and iron hydroxides, the reduction is done as follows. The reduction furnace is slowly ramped from room temperature to about 275° C. to remove ammonia and water vapor from the APT to form $WO_3$. The temperature is next ramped to 750° C. to about 1000° C. to reduce the hydroxides and oxides to their respective metals. As a result of the reduction of compounds which have been hydrometallurgically produced, each of the resulting metal particulates is an admixture in itself of all the component metals which form the alloy.

The resulting metal powder in the container is then sintered by well known methods to a density at or near the theoretical density. This is considered to be equal to or greater than about 90% of the theoretical density of the alloy. Depending on the application and on the composition, the material can be solid state sintered or liquid phase sintered to form the sheet. For example, if the sheet is to be rolled, it is necessary to get the density to at least about 90% to about 93% of the theoretical. With a weight composition consisting essentially of about 7% Ni, about 3.% Fe, and about 90% W, solid state sintering would be sufficient. Sintering temperatures and times depend on the nature of the alloy and on the density desired for the specific application. In the example above, the solid state sintering temperature is from about 1400° C. to about 1430° C. Liquid phase sintering is preferable for better rolling, higher density and healing of cracks which can form during drying. Densities of about 99.4% of theoretical have been achieved. Usually liqud phase sintering results in a more uniform composition of the alloy components throughout the sheet. The liquid phase sintering temperature is above the solidus temperature of the matrix phase of the alloy but below the melting point of the tungsten.

After sintering, the resulting sheet is removed from the container. This is done easily because the material of which the container is made allows the sheet to be released.

The resulting sheet can now be processed by known methods of hot rolling and annealing to form the final size sheet. However, when the process of the present invention is followed to produce a sheet which is close to the desired final thickness, less rolling and annealing are required than with sheets formed by prior art methods. This is because the material in the container is close to the desired size sheet.

One preferred system is ammonium paratungstate (APT) crystallized with iron and nickel hydroxides. An example of how a sheet is made from these compounds is given in the Example below.

To more fully illustrate this invention, the following non-limiting example is presented. All parts, portions, and percentages are on a weight basis unless otherwise stated. Example About 60 parts of Ni powder are dissolved in about 240 parts of concentrated HCl and about 200 parts of water. About 25.5 parts of Fe powder is dissolved in about 120 parts of concentrated HCl and about 100 parts of water. The resulting solutions are combined. About 1103 parts of ammonium metatungstate are dissolved in about 1000 parts of water and the resulting concentrated solution is combined with the iron and nickel acid solution. The pH is raised to about 6.5 to about 7.5 with ammonium hydroxide. The resulting preciptiate of APT and iron and nickel hydroxides is filtered off, dried, and deagglomerated. The precipitate is then introduced into zirconia coated molybdenum boats. The reduction furnace is slowly ramped from room temperature to almost about 275° C. to remove ammonia and water vapor from the ammonium paratungstate compound to form $WO_3$. The temperature would next be ramped to 750° C. to 800° C. to reduce the hydroxides or oxides to their respective metals. The temperature is next ramped up to about 1000° C. for presintering to give the material additional strength and for final reduction of any oxides which have formed. At this point, the presintered heavy alloy is liquid phase sintered in a hydrogen tube furnace or in a vacuum/hydrogen furnace. After sintering, the sheet preform may then be heated, rolled and annealed to final dimensions and properties.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing tungsten heavy alloy sheet, said process comprising:
   (a) crystallizing from solution, compounds of the component metals of said alloy and drying said compounds;
   (b) introducing said compounds into a container so that said compounds are uniformly packed in said container, said container being made of molybdenum coated with a ceramic, said container having the same shape as the sheet which is to be made;
   (c) reducing said compounds to their respective metals; and
   (d) sintering said metal powder to a density equal to or greater than about 90% of the theoretical density of said alloy to form said sheet.

2. A process of claim 1 wherein said compounds are selected from the group consisting of ammonium metatungstate and ammonium paratungstate, nickel hydroxide and iron hydroxide.

3. A process of claim 1 wherein said ceramic is zirconia.

* * * * *